United States Patent
Dettinger et al.

(10) Patent No.: US 7,720,858 B2
(45) Date of Patent: May 18, 2010

(54) QUERY CONDITIONS-BASED SECURITY

(75) Inventors: Richard D. Dettinger, Rochester, MN (US); Daniel P. Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 812 days.

(21) Appl. No.: 10/897,335

(22) Filed: Jul. 22, 2004

(65) Prior Publication Data

US 2006/0020581 A1 Jan. 26, 2006

(51) Int. Cl.
*G06F 17/30* (2006.01)
(52) U.S. Cl. .................. 707/769; 707/783; 711/162
(58) Field of Classification Search .............. 707/3, 707/9; 711/162
See application file for complete search history.

(56) References Cited

U.S. PATENT DOCUMENTS

| | | | | |
|---|---|---|---|---|
| 5,941,947 A * | 8/1999 | Brown et al. | | 709/225 |
| 6,105,027 A * | 8/2000 | Schneider et al. | | 707/9 |
| 6,122,741 A * | 9/2000 | Patterson et al. | | 707/9 |
| 6,366,915 B1 * | 4/2002 | Rubert et al. | | 707/10 |
| 6,725,227 B1 | 4/2004 | Li | | |
| 2003/0115205 A1 * | 6/2003 | French et al. | | 707/100 |
| 2004/0044655 A1 * | 3/2004 | Cotner et al. | | 707/3 |
| 2004/0064454 A1 * | 4/2004 | Ross et al. | | 707/9 |
| 2004/0073539 A1 * | 4/2004 | Dettinger et al. | | 707/3 |

FOREIGN PATENT DOCUMENTS

CN 1399746 A 2/2003

OTHER PUBLICATIONS

Creating and Managing SMS Queries (SMS 2003 Operations Guide), Oct. 2003<http://www.microsoft.com/technet/prodtechnol/sms/sms2003/opsguide/ops_9416.mspx>.*
Dettinger et al., IBM U.S. Appl. No. 10/083,075 (ROC920020044US1), filed Feb. 26, 2002, "Application Portability and Extensibility Through Database Schema and Query Abstraction".

* cited by examiner

*Primary Examiner*—Hosain T Alam
*Assistant Examiner*—Jieying Tang
(74) *Attorney, Agent, or Firm*—Patterson & Sheridan, LLP

(57) ABSTRACT

A method, system and article of manufacture for managing access to queries and, more particularly, for managing access by multiple users to persistently stored queries. One embodiment provides a method of managing access by multiple users to a predefined query against data in a database. The method comprises associating one or more access rights with at least some portion of the predefined query. When a request to access the predefined query by a first user is received, access to the predefined query by the first user is limited on the basis of the access rights.

10 Claims, 6 Drawing Sheets

QUERY CONDITIONS-BASED SECURITY

CROSS-REFERENCE TO RELATED APPLICATIONS

This application is related to commonly owned, co-pending U.S. patent application Ser. No. 10/083,075, entitled "Application Portability And Extensibility Through Database Schema And Query Abstraction," filed Feb. 26, 2002, which is incorporated by reference in its entirety.

BACKGROUND OF THE INVENTION

1. Field of the Invention

The present invention generally relates to query processing and, more particularly, to managing access by multiple users to persistently stored queries.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations. Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

Any requesting entity, including applications, operating systems and, at the highest level, users, can issue queries against data in one or more databases. Queries may be hard coded as part of an application or may be generated in response to input (e.g., user input). A given requesting entity may execute a multiplicity of different queries. Upon execution of each query against one or more databases, a corresponding query result is returned to the requesting entity. Any query and/or corresponding query result(s) can be stored persistently.

Persistently stored queries and/or query results can be shared by multiple users. In other words, queries which are created by a given user can be stored persistently and made available to other users. The given user may even create queries which are only intended for use by one or more other users. For instance, a database administrator may create predefined queries in a particular query language for users which need to retrieve information from one or more underlying databases, but which are not familiar with the particular query language. Thus, these users simply need to execute the predefined queries to retrieve required information from the underlying database(s).

However, one difficulty in sharing persistently stored queries between multiple users is that a particular predefined query may not exactly satisfy the needs of different users. For instance, assume that a database administrator in a company has created predefined queries using a specific query language which are intended for use by sales managers of the company. The predefined queries may be relatively complex queries that are suitable to retrieve data related to individuals of different target groups. Assume further that a given sales manager starts selling a new product of the company. Accordingly, the given sales manager may identify a corresponding target group for the new product and gather information about individuals in this target group using a corresponding predefined query.

The given sales manager may then precisely address an advertising campaign to the individuals in the identified target group using the gathered information. Assume now that the identified target group consists of teenagers and young adults which are 14 to 25 years old and which satisfy various conditions, such as having particular hobbies. Assume further that a predefined query exists which is adapted to retrieve information for 18 to 25 year old teenagers and young adults, which satisfy the same various conditions. The given sales manager may use this predefined query, but the predefined query must be modified in order to request also the required information related to those 14 to 17 years old.

However, after modification, the predefined query is no longer directed towards the original 18 to 25 year old target group. In other words, a general intent of the predefined query is changed by the modification. This change may affect subsequent executions of the predefined query by other users which would only require information related towards the original target group. Furthermore, in some instances, the predefined query can be damaged unintentionally during modification, especially if the sales manager is not familiar with the specific query language.

Therefore, there is a need for an efficient technique for sharing persistently stored queries between multiple users which disables undesired modifications to the persistently stored queries.

SUMMARY OF THE INVENTION

The present invention is generally directed to a method, system and article of manufacture for managing access to queries and, more particularly, for managing access by multiple users to persistently stored queries.

One embodiment provides a method of managing access by multiple users to a predefined query against data in a database. The method comprises associating one or more access rights with at least some portion of the predefined query. When a request to access the predefined query by a first user is received, access to the predefined query by the first user is limited on the basis of the access rights.

Another embodiment provides a method of managing access by multiple requesting entities to a predefined query against data in a database. The method comprises creating access rights configured for restricting access to the predefined query, and associating the access rights with the predefined query. Access to some or all of the predefined query is granted to a requesting entity on the basis of the access rights.

Still another embodiment provides a computer-readable medium containing a program which, when executed by a processor, performs a process of managing access by multiple users to a predefined query against data in a database. The process comprises associating one or more access rights with at least some portion of the predefined query. When a request to access the predefined query by a first user is received, access to the predefined query by the first user is limited on the basis of the access rights.

Still another embodiment provides a system comprising a predefined query, one or more access rights and a query manager. The one or more access rights are associated with at least some portion of the predefined query. The query manager is configured for receiving a request to access the predefined query by a first user, and limiting access to the predefined query by the first user on the basis of the access rights.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1A:
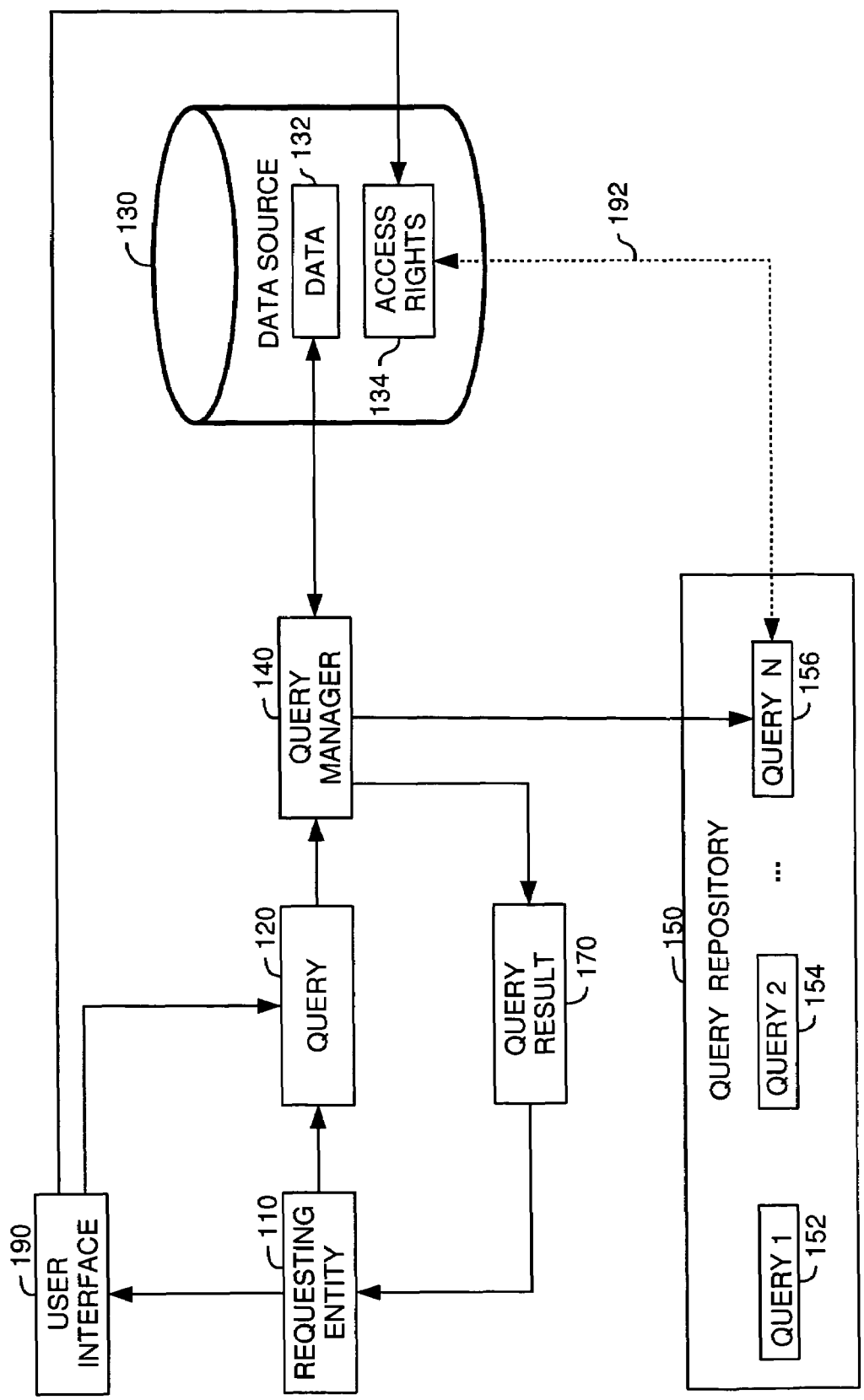
FIG. 1A is a relational view of software components for creation of persistently stored queries in one embodiment.

The present invention is generally directed to a method, system and article of manufacture for managing access to queries and, more particularly, for managing access by multiple users to persistently stored predefined queries. According to one aspect, multiple users are allowed to change and explore data of one or more databases using predefined queries. The multiple users are further allowed to operate at least to some extent on the predefined queries, whereby any damage to some form of general intent of the predefined queries is avoided. To this end, access rights are associated with one or more portions of the predefined queries. By way of example, these access rights can be similar to access rights of database columns. In one embodiment, each query condition within a given predefined query is associated with access rights (also referred to as "privileges"). The privileges on a particular query condition are configured to define what a corresponding query tool would allow a particular user to do with this query condition.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1A, a relational view of software components in one embodiment is illustrated. According to one aspect, the software components are configured for obtaining a subset of data from a data source using a query. The software components are further configured for persistently storing the query and for creating and/or associating access rights with the persistently stored query.

Illustratively, the software components include a requesting entity 110, a query manager 140 and a user interface 190. According to one aspect, the requesting entity 110 issues queries, such as query 120, against data 132 of a data source 130. The data source 130 is representative of any collection of data regardless of the particular physical representation. In one embodiment, the data source 130 includes one or more databases. Each of the one or more databases may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The query 120 issued by the requesting entity 110 may be predefined or may be generated in response to input received, for example, via the user interface 190 (e.g., user input). The query manager 140 executes the query 120 against the data 132 of the data source 130 to obtain a query result 170. Subsequently, the query result 170 is presented to the requesting entity 110.

In one embodiment, the query 120 is an SQL query. One of the most common executed SQL queries is the SELECT statement. The SELECT statement generally has the format: "SELECT<clause>FROM<clause>WHERE<clause>GROUP BY<clause>HAVING<clause>ORDER BY<clause>". The clauses must generally follow this sequence. Only the SELECT and FROM clauses are required and all other clauses are optional. The result of a SELECT statement is, in general, a subset of data retrieved from one or more existing tables (e.g., data 132) stored in a relational database (e.g., data source 130 of FIG. 1), wherein the FROM clause identifies the name of the table or tables from which the data is being selected. The subset of data is treated as a new table, termed the result table. The WHERE clause determines which rows should be returned in the result table. Generally, the WHERE clause contains one or more query conditions that must be satisfied by each row returned in the result table. The query condition(s) are typically one or more predicates, each of which specifies a comparison between two values from certain columns, constants or correlated values using suitable comparison operators, such as "=", ">" and "<". Multiple predicates in the WHERE clause are typically connected by Boolean operators, such as Boolean AND and/or OR operators.

In another embodiment, the query 120 is an abstract query. An abstract query is composed using logical fields defined by a data abstraction model. Each logical field is mapped to one or more physical entities of data of an underlying data representation being used in the data source 130 (e.g., XML, SQL, or other type representation). Furthermore, in the data abstraction model the logical fields are defined independently from the underlying data representation, thereby allowing queries to be formed that are loosely coupled to the underlying data representation. The abstract query can be configured to access the data 132 and return query results, or to modify (i.e., insert, delete or update) the data 132. For execution against the data 132, the abstract query is transformed into a form (referred to herein as concrete query) consistent with the underlying data representation of the data 132. Transformation of abstract queries into concrete queries is described in detail in the commonly owned, co-pending U.S. patent application Ser. No. 10/083,075, entitled "Application Portability And Extensibility Through Database Schema And Query Abstraction," filed Feb. 26, 2002, which is incorporated by reference in its entirety.

In one embodiment, the query manager 140 stores the query 120 as a persistent data object 156 "QUERY N" in a query repository 150. Illustratively, the query repository 150 already includes a multiplicity of queries 152 "QUERY 1" and 154 "QUERY 2" (only two are shown, for brevity) which are also stored as persistent data objects. However, it should be noted that providing the query repository 150 with the queries 152, 154 and 156 is merely illustrative and not intended for limiting the invention accordingly. For instance, the queries 152, 154 and 156 may be created by different requesting entities and stored individually at different locations in a corresponding data processing system.

In one embodiment, access to the queries 152, 154 and 156 is restricted on the basis of access rights 134 (as represented by dashed arrow 192). Illustratively, the access rights 134 are stored in the data source 130. By way of example, the access rights 134 may define for each of a plurality of requesting entities whether the corresponding requesting entity is authorized to access some or all of one or more of the queries 152, 154, 156. The access rights 134 may further define for one or more groups of requesting entities whether the corresponding group(s) is authorized to access some or all of the of one or more of the queries 152, 154, 156. Furthermore, the access rights 134 may define different types of access for different portions of one or more of the queries 152, 154, 156 and/or different requesting entities or groups of requesting entities. More specifically, access to a given query can be restricted by presenting only a limited portion of the given query to a corresponding requesting entity based on the access rights attached to the given query. Access to the given query can further be restricted by disabling modifications by a corresponding requesting entity to at least a portion of the given query based on the access rights attached to the given query.

In one embodiment, the access rights 134 are created using the user interface 190. According to one aspect, the access rights 134 are created by an authorized requesting entity, such as a database administrator. Furthermore, access rights for a given one of the queries 152, 154 and 156 can be created at creation time by a corresponding requesting entity that creates the given one of the queries 152, 154 and 156. Operation of the query manager 140 for restricting access to the queries 152, 154 and 156 is explained in more detail below with reference to FIGS. 1B-C.

Figure 1B:
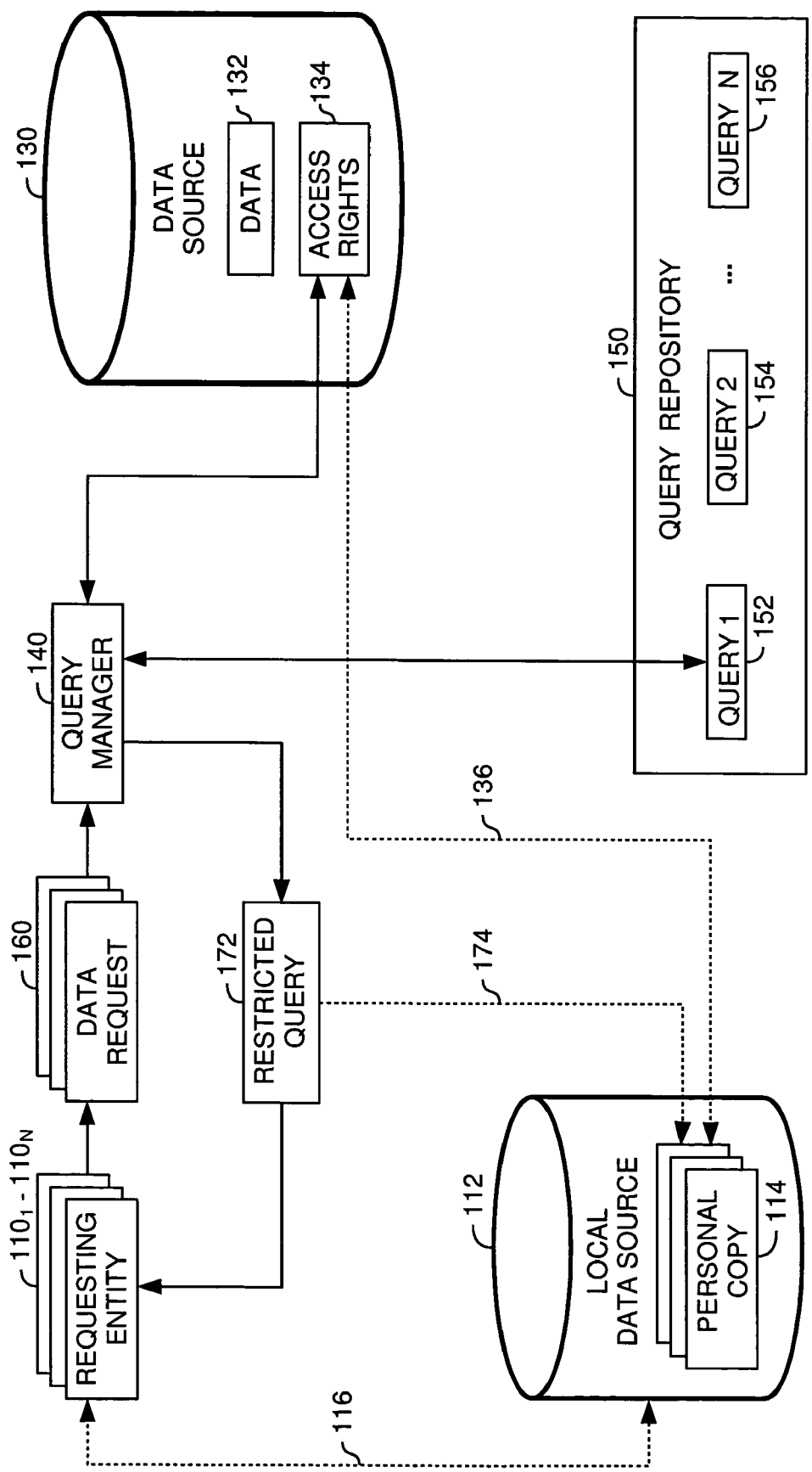
FIG. 1B is a relational view of the software components of FIG. 1A for managing access to persistently stored queries in one embodiment.

FIG. 1B shows a relational view of the software components of FIG. 1A in an embodiment for managing access to the queries 152, 154 and 156. Illustratively, a plurality of requesting entities $110_1$-$110_N$ issues data requests 160 for obtaining data related to the queries 152, 154, and 156. By way of example, assume that one of the requesting entities $110_1$-$110_N$ (hereinafter referred to as "requesting entity 110") issues one of the data requests 160 (hereinafter referred to as "data request 160") for accessing the query 152 "QUERY 1". The query manager 140 receives the data request 160 and determines whether the requesting entity 110 is authorized to access all or at least some of the query 152. To this end, the query manager 140 accesses the access rights 134 in the data source 130. Assume now that the access rights 134 authorize the requesting entity 110 to access only one or more portions of the query 152, but not the entire query 152. Accordingly, on the basis of the access rights 134, the query manager 140 identifies the one or more portions from the query 152. The query manager 140 then presents the one or more portions from the query 152 as a restricted query 172 to the requesting entity 110. The restricted query 172 can be presented to the requesting entity 110 with an indication that the presented query is restricted on the basis of the access rights 134.

In one embodiment, the access rights 134 are defined for a plurality of potential requesting entities, including the requesting entities $110_1$-$110_N$. As was noted above, the access rights 134 can be implemented in order to define for the queries 152, 154, 156 which requesting entity of the requesting entities $110_1$-$110_N$ is allowed to access that query. Furthermore, the access rights 134 may be provided with a user or application-specific granularity. For instance, the access rights 134 can be configured for restricting access to entire queries or components of queries, such as query conditions. Accordingly, different scenarios may occur in which different access rights to one of the queries 152, 154, 156 are determined for different requesting entities based on the access rights 134. In other words, while all these requesting entities are operating on the same query, i.e., query 152, different query data can be presented to each of these requesting entities. By way of example, a first portion of the query 152 may be presented to a first requesting entity and a second portion of the query 152 may be presented to a second requesting entity, whereby the first portion contains one or more data objects not presented in the second portion.

Exemplary scenarios in which different requesting entities illustratively represented by users attempt to access a single predefined query are described below with reference to Tables II-V. An exemplary predefined query is described below with reference to Table I.

TABLE I

EXEMPLARY PREDEFINED QUERY

| 001 | SELECT * |
| 002 | FROM table-x |
| 003 | WHERE (cond1 AND cond2 AND cond3) |

As can be seen from Table I, the exemplary query is predefined for execution against a database table "table-x" (line 002). Specifically, the exemplary query can be used to determine all rows of the database table "table-x" (line 001) which satisfy specific query conditions "cond1" and "cond2" and "cond3" (line 003).

TABLE II

EXEMPLARY SCENARIO 1

| 001 | Condition "cond1" can be modified by John Smith |
| 002 | Condition "cond2" can only be read |
| 003 | Conditions can be added by group "RESEARCHERS" |

In the exemplary scenario 1 of Table II, the access rights 134 for the exemplary query of Table I are defined such that only a user "John Smith" may modify the query condition "cond1" (line 001). In other words, according to line 001 the user "John Smith" may change parameters, such as operators and values of the query condition "cond1". According to line 002, the access rights 134 are defined such that all users may only read, but not modify the query condition "cond2". Furthermore, the complete query of Table I is associated with an access right defined according to line 003. More specifically, according to line 003 the access rights 134 are defined such that only users of a group "RESEARCHERS" may add one or more query conditions to the exemplary query of Table I. As no access rights are specified for the query condition "cond3" in scenario 1, according to one aspect all users may operate on this query condition as desired.

TABLE III

EXEMPLARY SCENARIO 2

| 001 | Condition "cond1" can be supplemented |
| 002 | Condition "cond3" is hidden |

In the exemplary scenario 2 of Table III, the access rights 134 for the exemplary query of Table I are defined such that any user may supplement the query condition "cond1" (line 001). According to one aspect, if a query condition can be supplemented, the user may not modify predicates of the query condition, but only add one or more additional predicates to the query condition. For instance, assume that the query condition "cond1" is configured to identify individuals which are at least 18 years old. Accordingly, the query condition "cond1" may be defined as follows: "Age>=18". Assume now that the user wants to determine individuals which are at least 18 years old, but which are not older than 25. In this case, the user may supplement the query condition "cond1" by adding a corresponding supplement query condition, such as "Age <=25". Consequently, the supplemented condition would correspond to a combination of the query condition "cond1" and the supplement query condition, i.e., "Age >=18 AND Age <=25". According to line 002, the access rights 134 are defined such that the query condition "cond3" is hidden to all users. Accordingly, the query defined in Table I may be presented to the user such that the query condition "cond3" is not displayed to the user. However, for some embodiments, in this case some indication can be displayed to the user for indicating that a portion of the query of Table III is hidden from display. Furthermore, as no access rights are specified for the query condition "cond2" in scenario 2, according to one aspect all users may operate on this query condition as desired.

TABLE IV

EXEMPLARY SCENARIO 3

| 001 | Static copy enabled |

In the exemplary scenario 3 of Table IV, the access rights 134 for the exemplary query of Table I are defined such that any user can make a personal copy of the exemplary query (line 001). This personal copy would then be associated with the same access rights than the exemplary query of Table I (i.e., access rights 134), as the personal copy is defined to be "static" (line 001 of Table IV).

By way of example, the requesting entity 110 of FIG. 1B has made a personal copy 114 of the query 152, which is illustratively stored in a local data source 112 associated with the requesting entity 110 (as illustrated by dashed arrow 116). As access to the query 152 is restricted on the basis of the access rights 134, access to the personal copy 114 is also restricted by the access rights 134 (as illustrated by dashed arrow 136). Accordingly, when the requesting entity 110 accesses the personal copy 114 of the query 152, the restricted query 172 would effectively be presented to the user (as indicated by dashed arrow 174).

TABLE V

EXEMPLARY SCENARIO 4

| | |
|---|---|
| 001 | Dynamic copy enabled |

In the exemplary scenario 4 of Table V, the access rights 134 for the exemplary query of Table I are defined such that any user can make a dynamic personal copy of the exemplary query (line 001). A dynamic personal copy may be modified as required by the user. In other words, the access rights 134 would not be associated with the dynamic personal copy.

Figure 1C:
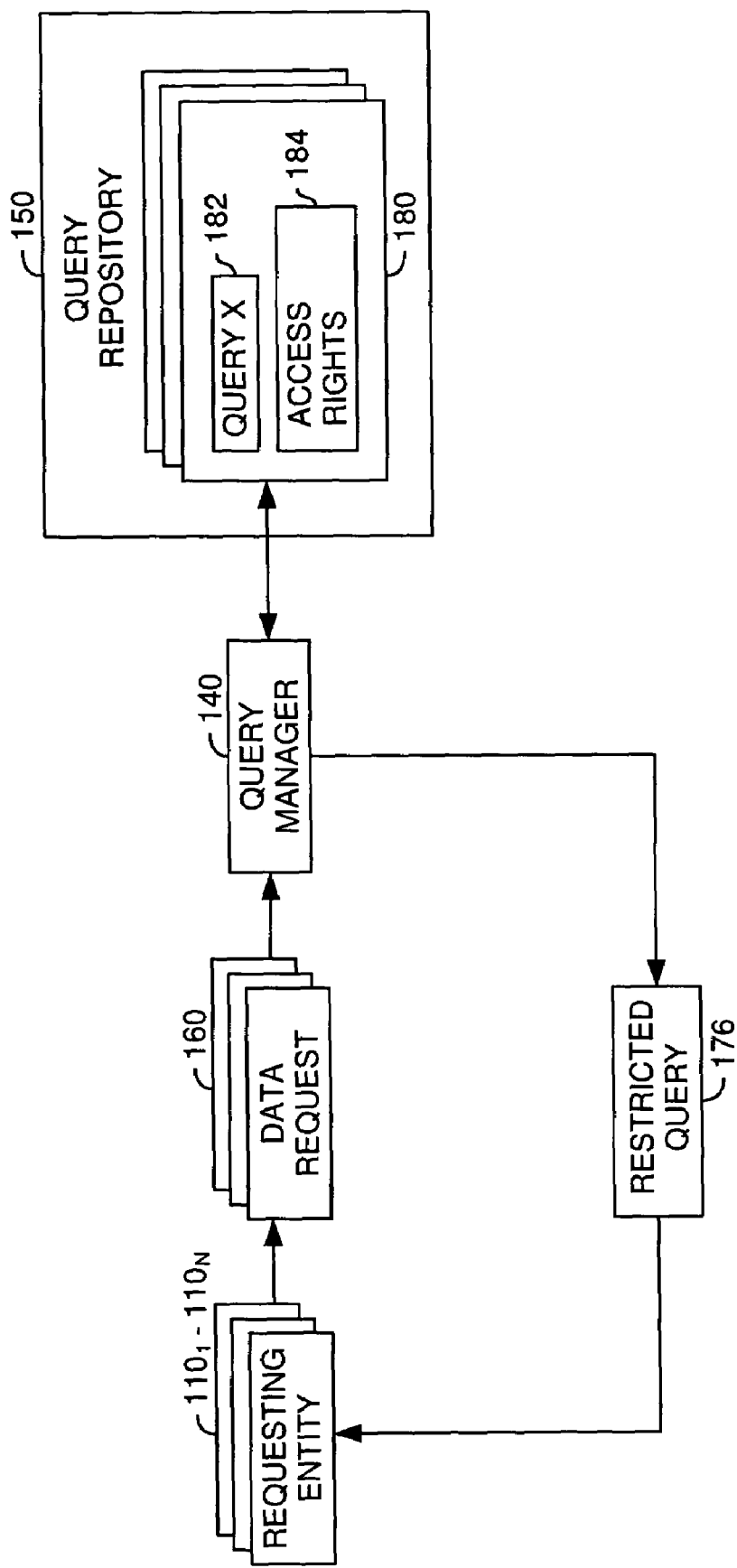
FIG. 1C is a relational view of the software components of FIG. 1A for managing access to persistently stored queries in another embodiment.

Referring now to FIG. 1C, a relational view of the software components of FIG. 1A in another embodiment for managing access to the queries 152, 154 and 156 is shown. Illustratively, a plurality of requesting entities $110_1$-$110_N$ issues data requests 160 against a plurality of queries 180, which are stored as persistent data objects in the query repository 150. Each query 180 includes query data 182 and associated access rights 184. According to one aspect, the query data 182 corresponds to data of a predefined query (e.g., one of queries 152-156 of FIG. 1A).

Assume now, by way of example, that the query manager 140 receives a given data request from the data requests 160 (hereinafter referred to as "data request 160") from a user who wants to access a given query 180 from the queries 180 (hereinafter referred to as "query 180"). An exemplary embodiment of the query 180 is described below with reference to FIG. 4.

Upon receipt of the data request 160, the query manager 140 determines whether the user is authorized to access all or at least some of the query data 182 of the query 180. To this end, the query manager 140 determines attributes from the user. The determined attribute(s) is suitable to identify the user. By way of example, the determined attribute(s) can be a user name, a user identifier, a role of the user or an authorization level associated with the user. The query manager 140 further determines access rights for the user with respect to the query data 182. The access rights for the user are determined on the basis of the access rights 184.

In one embodiment, the access rights 184 are created on the basis of the access rights 134 of FIG. 1A. Accordingly, the access rights 184 may be suitable for a plurality of potential users of the query data 182. In other words, the access rights 184 can be suitable for each potential user with respect to some or all of the query data 182. Alternatively, the access rights 184 may define a link to the access rights 134. In this case, the access rights 134 are used for determining whether the potential user(s) is authorized to access some or all of the query data 182. Still alternatively, the access rights 184 can be created at creation time of the query data 182 and stored together with the query data 182 as the persistent data object 180.

Specifically, in the example illustrated in FIG. 1C, the query manager 140 determines on the basis of the access rights 184 stored together with the query data 182 whether the requesting entity 110 is authorized to access the query data 182. More specifically, using the access rights 184 the query manager 140 identifies portions from the query data 182 to which access by the user is allowed. The query manager 140 then presents the identified portions as restricted query 176 to the user. Operation of the query manager 140 is described in more detail below with reference to FIG. 2.

Figure 2:
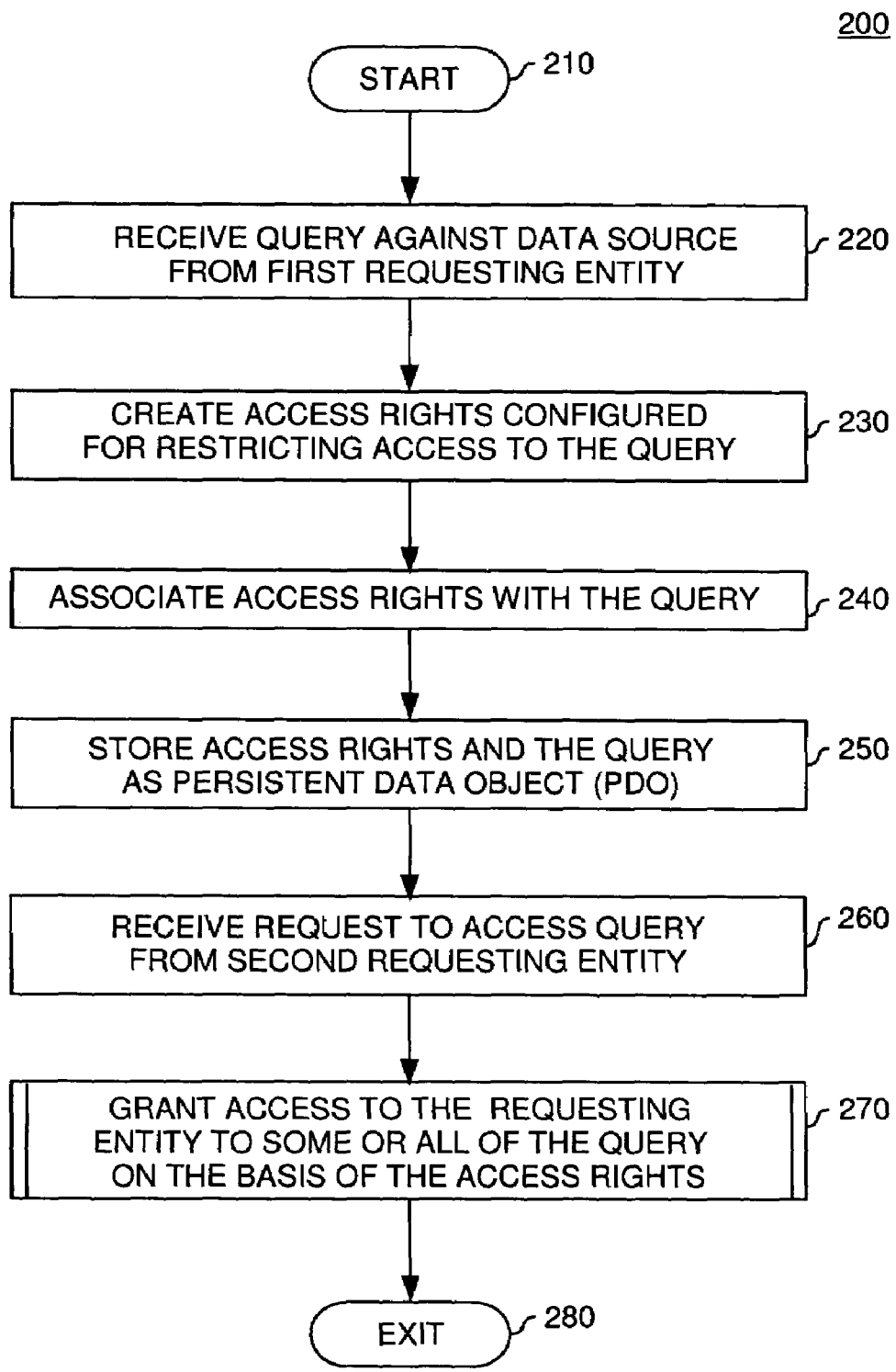
FIGS. 2-3 are flow charts illustrating a method for managing access to a persistently stored query in one embodiment.

Referring now to FIG. 2, one embodiment of a method 200 for managing access by multiple users to a predefined query (e.g., one of queries 152, 154, 156 of FIG. 1A) is shown. At least part of the steps of method 200 can be performed using a query manager (e.g., query manager 140 of FIG. 1A) and a user interface (e.g., user interface 190 of FIG. 1A). Method 200 starts at step 210.

At step 220, a query (e.g., query 120 of FIG. 1A) from a first requesting entity (e.g., requesting entity 110 of FIG. 1A) against a data source (e.g., data source 130 of FIG. 1A) is received. At step 230, access rights are created for the query. According to one aspect, the access rights are created by the first requesting entity using the user interface. The access rights are configured for restricting access to the query. In one embodiment, creating the access rights includes storing the access rights in the data source (e.g., access rights 134 of FIG. 1A). Accordingly, the query manager may link the query with the access rights (e.g., access rights 134 of FIG. 1B) at runtime when a request for accessing the query is received. In another embodiment, creating the access rights includes preparing the access rights (e.g., access rights 184 of FIG. 1C) for storage together with the query in a persistent data object (e.g., query 180 of FIG. 1C). Alternatively, the access rights in the persistent data object may define a link to the access rights stored in the data source.

At step 240, the access rights are associated with the query. In one embodiment, at step 250, the access rights are stored together with the query as a persistent data object (e.g., query 180 of FIG. 1C). Alternatively, when the access rights are stored in the data source, only the query can be stored as a persistent data object (e.g., query 152 of FIG. 1B).

It should be noted that the persistent data object that has been stored at step 250 can subsequently be accessed by multiple requesting entities on the basis of the associated access rights. Illustratively, at step 260a data request (e.g., data request 160 of FIGS. 1B-C) is received from a second requesting entity (e.g., requesting entity 110 of FIGS. 1B-C) for accessing the query, which has been stored as a persistent data object at step 250.

At step 270, access to at least one or more portions of the persistent data object is granted or denied on the basis of the access rights. An exemplary method of granting access to a persistent data object is described below with reference to FIG. 3. Method 200 then exits at step 280.

Figure 3:
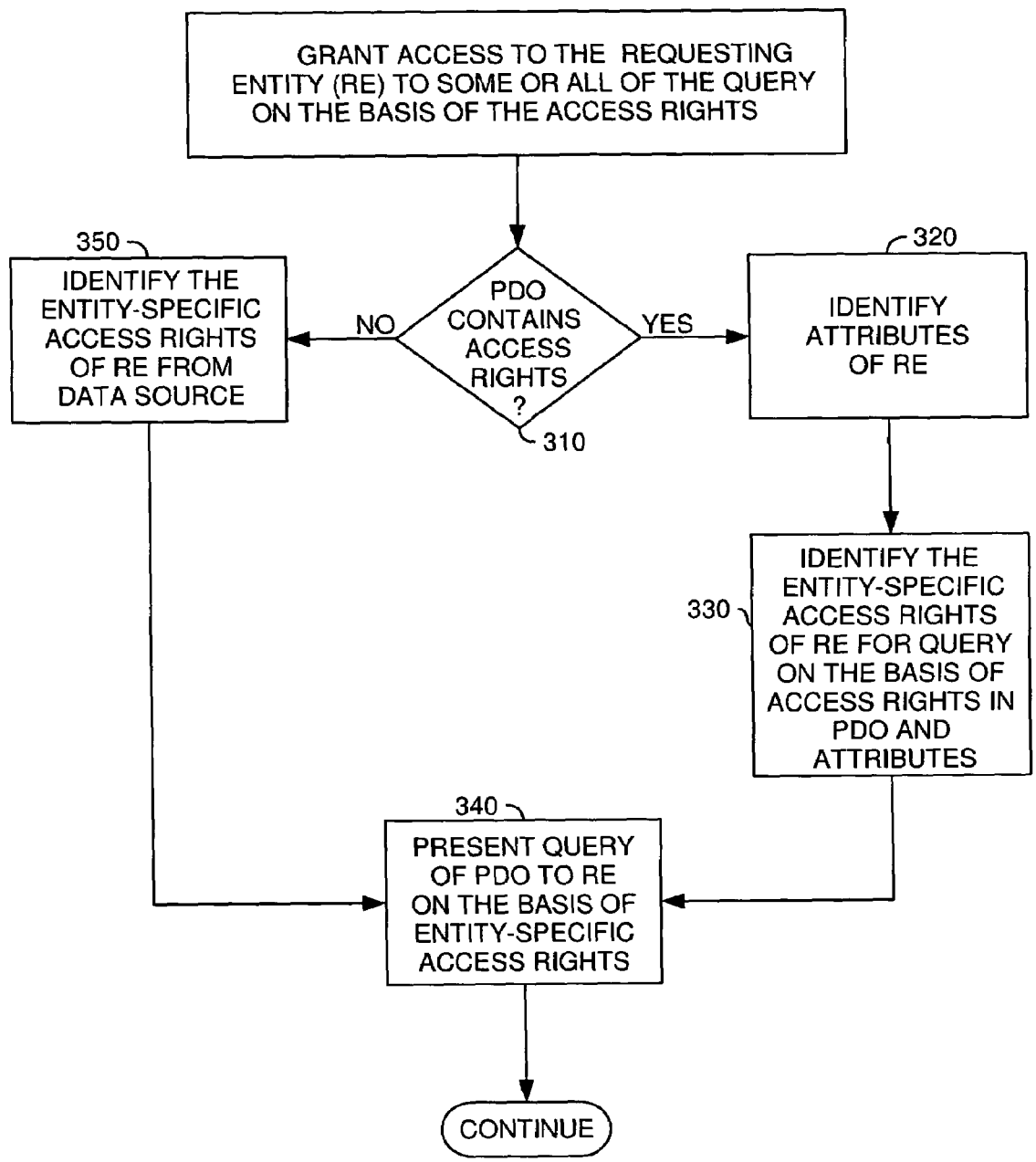

Referring now to FIG. 3, an exemplary method 300 of granting access to a persistent data object (e.g., query 152 of FIG. 1B or query 180 of FIG. 1C) according to step 270 of FIG. 2 is shown. At least part of the steps of method 300 can be performed using a query manager (e.g., query manager 140 of FIGS. 1B-C). Method 300 starts at step 310, where it is determined whether the persistent data object includes access rights (e.g., access rights 184 of FIG. 1C).

If access rights are included with the persistent data object (e.g., query 180 of FIG. 1C), one or more attributes of the requesting entity are determined at step 320. Then, at step 330, entity-specific access rights to the persistent data object are identified for the requesting entity on the basis of the access rights contained in the persistent data object and the determined attribute(s). In other words, the access rights contained in the persistent data object are analyzed to identify whether access rights which are specific to the requesting entity can be derived therefrom. For instance, the access rights contained in the persistent data object can be analyzed to identify portions thereof which specifically authorize access of a requesting entity having the determined attribute(s). Furthermore, the access rights contained in the persistent data object can be analyzed to identify portions thereof which are not specifically excluded from access by a requesting entity having the determined attribute(s). However, it should be noted that the access rights can be implemented in various different ways. As was noted above, the access rights can be associated with specific users and/or groups of users. However, the access rights may also be specified with respect to portions of the query data of the persistent data object, such as query conditions, without reference to any specific user or group of users. Therefore, the invention is not limited to a particular implementation of the access rights and contemplates extension to other implementations, including presently unknown implementations.

At step 340 nothing, one or more portions, or the entire persistent data object is presented as restricted query (e.g., restricted query 176 of FIG. 1C) to the requesting entity on the basis of the identified entity-specific access rights. Processing then continues at step 280 of FIG. 2.

If, however, it is determined at step 310 that access rights are not included with the persistent data object (e.g., query 152 of FIG. 1B), corresponding entity-specific access rights for the requesting entity are determined at step 350 from access rights stored in a corresponding data source (e.g., access rights 134 of FIG. 1B). Processing then continues at step 340.

Figure 4:
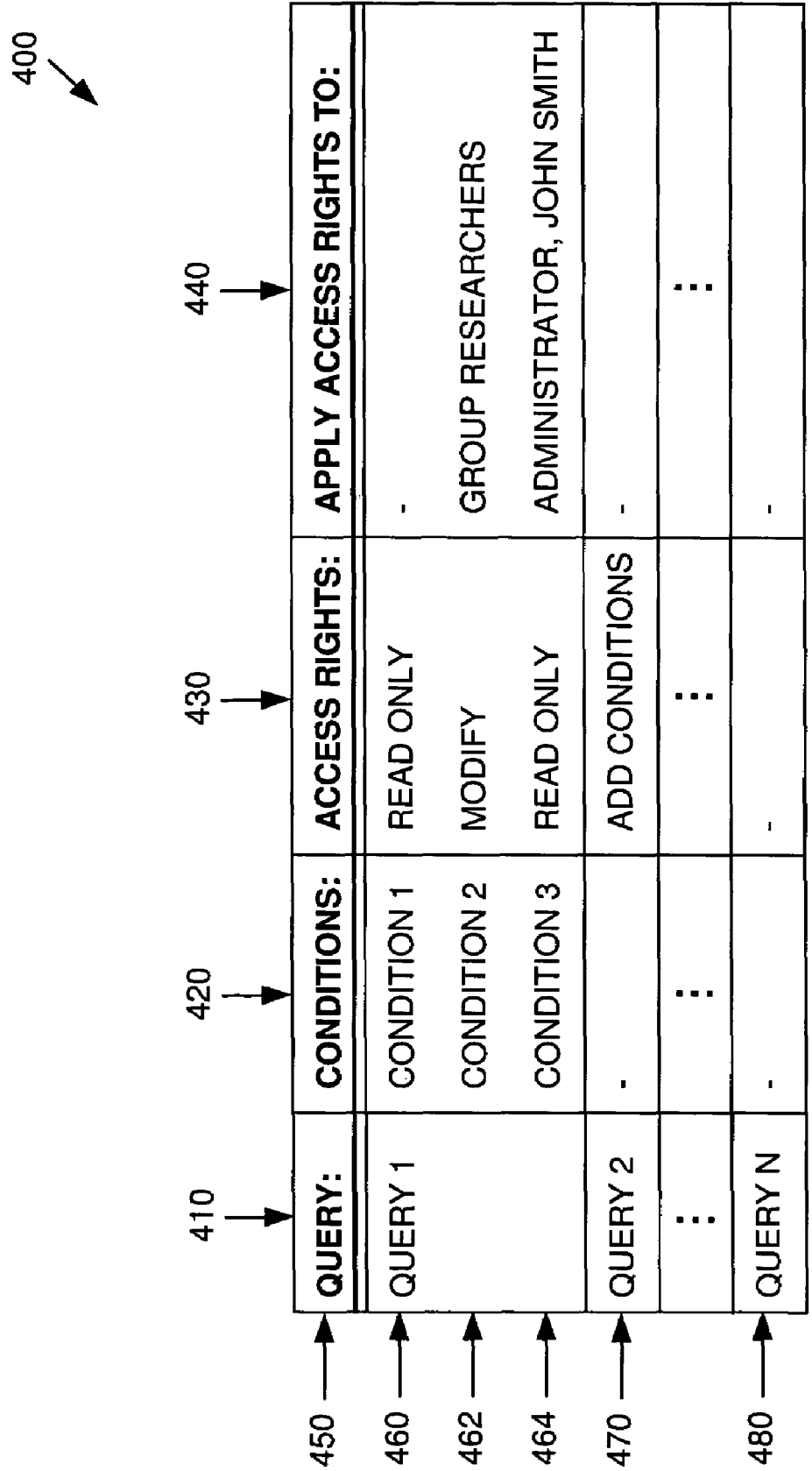
FIG. 4 is a table illustrating persistently stored queries and associated access rights in one embodiment.

Referring now to FIG. 4, one embodiment of a data structure 400 including exemplary persistent data objects (e.g., persistent data objects 180 of FIG. 1C) is shown. By way of example, the data structure 400 is shown in tabular form having a plurality of columns 410-440 and rows 450-480.

The row 450 displays titles of the columns 410-440. However, it is understood that row 450 is merely displayed for purposes of illustration and, thus, optional. As can be seen from row 450, the columns 410-420 contain query data (e.g., query data 182 of FIG. 1C). The columns 430-440 contain specifications of access rights (e.g., access rights 184 of FIG. 1C). More specifically, the column 410 illustratively contains identifications of predefined queries. The column 420 illustratively contains query conditions. The column 430 illustratively contains access rights associated with the different query conditions. The column 440 illustratively contains indications of users/groups of users, to which the access rights contained in column 430 are applied.

By way of example, the rows 460-464 are related to a first query "QUERY 1" having three query conditions, i.e., "CONDITION 1", "CONDITION 2" and "CONDITION 3". In the rows 460-464, access rights for these three query conditions are defined. More specifically, according to row 460 the access right defined for the query condition "CONDITION 1" is of a "READ ONLY" type (column 430). This access right is applied to all users as no specific user or group of users is defined for "CONDITION 1" in column 440. In other words, the query condition "CONDITION 1" is allowed for read only access by all users.

According to row 462, the access right defined for the query condition "CONDITION 2" is of a "MODIFY" type (column 430). This access right is applied to all users of a group "RESEARCHERS" (column 440). In other words, all users of the group "RESEARCHERS" are allowed to modify the query condition "CONDITION 2". According to one aspect, as the defined access right is "MODIFY" and as no access rights to "CONDITION 2" are defined for other users or groups of users, the query condition "CONDITION 2" can by default be hidden to the other users/groups of users or allowed for read only access. To this end, user-specific or application-specific default access rights can be defined in one embodiment.

According to row 464, the access right defined for the query condition "CONDITION 3" is of the "READ ONLY" type (column 430). This access right is applied to two users, a first user "ADMINISTRATOR", e.g., a database administrator, and a second user "JOHN SMITH" (column 440). In other words, only the "ADMINISTRATOR" and "JOHN SMITH" are allowed to read the query condition "CONDITION 3". For instance, assume that "QUERY 1" has been created by "JOHN SMITH" in a company X. The "QUERY 1" allows access to local data of "JOHN SMITH", e.g., data related to a research project which is elaborated by "JOHN SMITH".

On the basis of "QUERY 1", "JOHN SMITH" allows access to the local data to all users in the company, but disables access to sensitive data using the query condition "CONDITION 3". In order to avoid an unintentional modification to the query condition "CONDITION 3" by himself, "JOHN SMITH" has set his access rights to "READ ONLY". Assume further that, according to internal procedures of the company X, the database administrator must be allowed to access all portions of any predefined query in the company X. For instance, the database administrator must be able to verify whether a given query condition does not unnecessarily restrict data access. Accordingly, in the given example the database administrator is allowed to read, but not to modify the query condition "CONDITION 3". Furthermore, as the defined access right is "READ ONLY" for two specific users, i.e., the "ADMINISTRATOR" and "JOHN SMITH", and as no access rights to "CONDITION 3" are defined for other users or groups of users, the query condition "CONDITION 3" can by default be hidden to all other users/groups of users.

The row 470 is related to a second query "QUERY 2". However, no particular query condition is indicated in column 420 for the second query "QUERY 2". Thus, the access right defined in column 430 for the second query "QUERY 2" applies to all components of the query. More specifically, according to column 430 the access right defined for the query "QUERY 2" is "ADD CONDITIONS". This access right is applied to all users as no specific user or group of users is defined for "QUERY 2" in column 440. In other words, any user may add one or more query conditions to the second query "QUERY 2".

The row 480 is related to a third query "QUERY N". However, no particular query condition is indicated in column 420 for the third query "QUERY N". Furthermore, no access rights are defined in column 430 for the third query "QUERY N". Accordingly, any user may operate on the third query "QUERY N" as desired.

It should be noted that different types of access, i.e., "READ ONLY", "MODIFY" and "ADD CONDITIONS" have been described with reference to FIG. 4 by way of example. However, other types of access can be provided, such as access allowing to supplement one or more query conditions of a given predefined query (e.g., scenario 2 of Table II). Still other types of access may allow to make static or dynamic copies of predefined queries (e.g. scenario 3 and 4 of Tables IV and V, respectively). Accordingly, all types of access and access rights described herein have merely been presented for purposes of illustration, but not for limiting the invention thereto. Instead, any type of access which is suitable to provide query and/or query conditions-based security is broadly contemplated.

While the foregoing is directed to embodiments of the present invention, other and further embodiments of the invention may be devised without departing from the basic scope thereof, and the scope thereof is determined by the claims that follow.

What is claimed is:

1. A computer-implemented method of managing access by multiple users to a predefined query against data in a database, comprising:

associating one or more access rights with a first portion of the predefined query, wherein the predefined query is composed using logical fields defined by a data abstraction model abstractly describing the data in the database, wherein each logical field is mapped to one or more physical entities of the data of an underlying data representation being used in the database, and wherein one of the access rights allows a first user to append query conditions to the query but not modify the first portion;

receiving, by a query manager application executing on a processor, a request to access the predefined query by the first user;

determining one or more attributes of the first user; and limiting access to the first portion of the predefined query by the first user on the basis of the access rights associated with the first portion of the predefined query and the one or more attributes of the first user, wherein limiting access to the predefined query by the first user on the basis of the access rights and the one or more attributes of the first user comprises allowing the user to make a personal copy of the predefined query and allowing the user to modify the personal copy and wherein the access rights associated with the predefined query are also associated with the personal copy.

2. The method of claim 1, wherein limiting access to the predefined query by the first user on the basis of the access rights and the one or more attributes of the first user further comprises:

identifying user-specific access rights for the first user from the access rights using the one or more determined attributes; and wherein access by the first user to some or all of the predefined query is granted on the basis of the user-specific access rights.

3. The method of claim 1, wherein the one or more attributes is at least one of:

(i) a user name;
(ii) a user role; and
(iii) a user authorization level.

4. The method of claim 1, wherein one type of access right prevents a second user from reading the first portion of the predefined query.

5. The method of claim 1, wherein one type of access right allows a second user to read and modify the first portion of the predefined query.

6. The method of claim 1, wherein one type of access right prevents the first user from reading the first portion of the predefined query.

7. A computer-implemented method of managing access by multiple requesting entities to a predefined query against data in a database, comprising:

creating access rights configured for restricting access to a first portion of the predefined query wherein the predefined query is composed using logical fields defined by a data abstraction model abstractly describing the data in the database, wherein each logical field is mapped to one or more physical entities of the data of an underlying data representation being used in the database;

associating the access rights with the predefined query;

granting, by a query manager application executing on a processor, access to first user to the first portion of the predefined query on the basis of the access rights and on the basis of one or more attributes of the first user, wherein one of the access rights allows the first user to append query conditions to the query but not modify the first portion and wherein the access granted to the predefined query by the first user on the basis of the access rights and the one or more attributes of the first user allows the first user to make a personal copy of the predefined query and allows the user to modify the personal copy; and allowing the first user to modify the access rights associated with the personal copy of the predefined query.

8. The method of claim 7, further comprising:

receiving a request for accessing the predefined query from the first user;

presenting the predefined query to the first user on the basis of the access rights; and displaying, to the first user, an indication of the access rights of the first user.

9. The method of claim 7, further comprising:

receiving a request for accessing the predefined query from the first user; and presenting the predefined query to the first user on the basis of the access rights, wherein at least one query condition of the predefined query is not presented in the predefined query.

10. The method of claim 7, wherein associating the access rights with the predefined query comprises:

storing the predefined query and the access rights as a persistent data object.

* * * * *